C. E. PAXSON.
Cultivator.
No. { 2,789, 33,793. }
Patented Nov. 26, 1861.
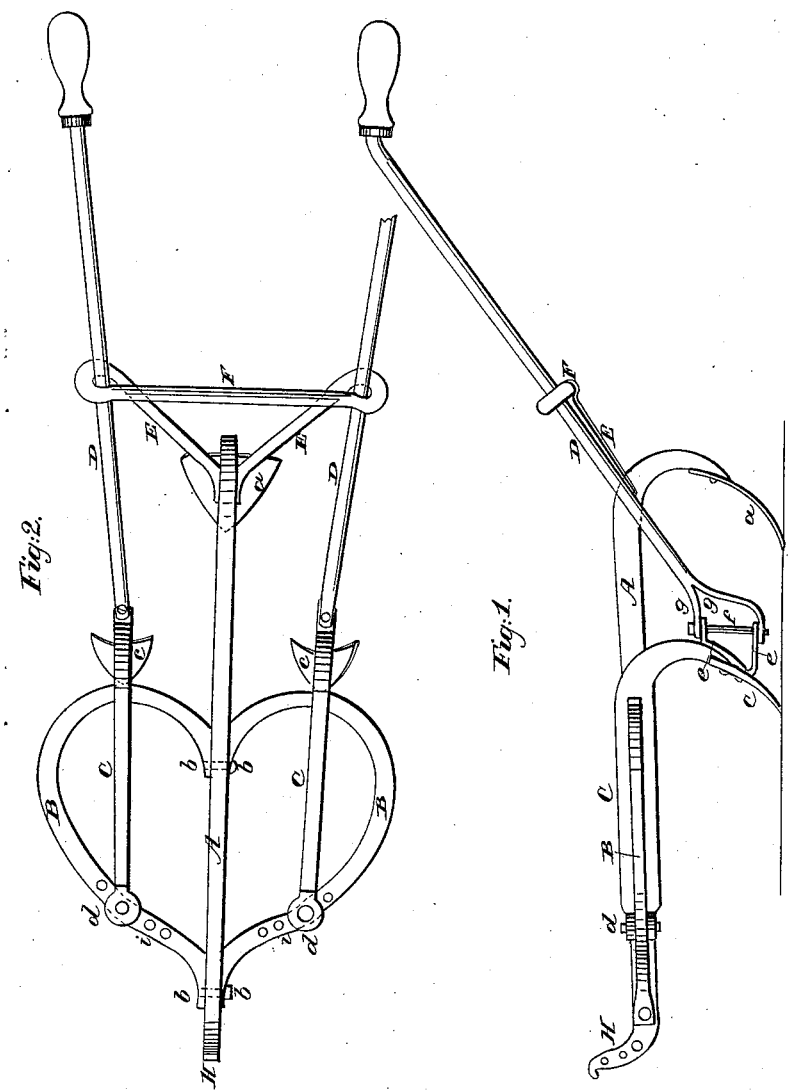
Witnesses.
J. W. Coombs
G. W. Reed
Inventor.
Charles E. Paxson
per Munn & Co.
attorneys

UNITED STATES PATENT OFFICE.

CHARLES E. PAXSON, OF SALEM, OHIO.

IMPROVEMENT IN CORN-PLOWS.

Specification forming part of Letters Patent No. 33,793, dated November 26, 1861.

*To all whom it may concern:*

Be it known that I, CHARLES E. PAXSON, of Salem, in the county of Columbiana and State of Ohio, have invented a new and Improved Corn-Plow; and I do hereby declare the following to be a full, clear, and exact description of the same, reference being had to the accompanying drawings, making a part of this specification, in which—

Figure 1 is a side elevation of my improved corn-plow. Fig. 2 is a plan of the same.

Similar letters of reference indicate corresponding parts in the several figures.

This invention is designed for cultivating in between the rows of corn; and it consists in the peculiar construction and adjustment of parts by which the implement is brought under the complete control of the operator, and adapted to follow and cultivate opposite sides of two straight or crooked rows with equal facility at one operation.

To enable others skilled in the art to fully understand and construct my invention, I will proceed to describe it.

A represents the main or draft beam of the implement, provided at its front end with a perforated bar, H, to receive the clevis, and bent down at its back end in hook shape to form a standard for the shovel $a$, which runs midway between the rows to cut off the grasses and weeds and to pulverize the surface-soil.

B B are fenders, permanently attached by bolts $b\ b$ on the opposite sides of the main or draft beam, and projecting laterally therefrom.

C C are forked side beams, bent down at their back end, in the same shape as the back end of the main beam, A, to form standards for the shovels $c\ c$, which are securely bolted on the inner side thereof. The forked side beams are attached to the front portion of the fenders by bolts $d\ d$, in such a manner as to admit of independent and free lateral movement of the shovels $c\ c$, to enable the operator to adjust them while the implement is in operation, so as to follow and cultivate crooked rows of corn.

D D are the handles, attached at their lower ends to the heel of the bent portion of the side beams by crane hinge-joints, each of which consists of two ears, $e\ e$, bolt $f$, and bifurcated end $g\ g$ of the handles.

E E are braces, attached at their lower ends to the sides of the main frame, immediately over the shovel $a$, and supporting at their upper ends a handle-guard, F, which is furnished at each end with an opening through which the handles are loosely fitted, and which act as fulcrums for the handles, as levers to expand and contract the side beams, and shovels to conform to the varying widths of the rows of corn.

By pressing the upper ends of the handles to or from each other the side beams and shovels, which are attached at their lower ends, are correspondingly moved in an opposite direction. The main beam and shovel is guided and governed in the same manner as a single-shovel plow.

The front portion of the fenders, to which the side beams are attached, are furnished with a number of holes, $i\ i$, which admit of the side beams being expanded or contracted to work in between a wide or narrow row, as may be desired.

The shovels attached to the side beams loosen and throw the soil up to and on opposite sides of two rows, thus virtually finishing a row of corn every time the implement passes through, while at the same time the shovel attached to the main beam effectually eradicates all grasses and weeds from between the rows, pulverizing the surface-soil and rendering it light and friable.

Having thus described my invention, what I claim as new, and desire to secure by Letters Patent, is—

The fenders B B, hinged forked bars C C, hinged handles D D, with the guard F, and draft-beam A, when combined, arranged, and operating in the manner described.

CHARLES E. PAXSON.

Witnesses:
SAMUEL H. BURNETT,
E. COPPACK.